(12) United States Patent
Kim et al.

(10) Patent No.: US 7,564,654 B2
(45) Date of Patent: Jul. 21, 2009

(54) ACTUATOR LATCH DEVICE FOR HARD DISK DRIVE

(75) Inventors: Do-wan Kim, Hwaseong-si (KR); Chul-woo Lee, Seongnam-si (KR); Ki-tag Jeong, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 462 days.

(21) Appl. No.: 11/483,846

(22) Filed: Jul. 11, 2006

(65) Prior Publication Data

US 2007/0019332 A1   Jan. 25, 2007

(30) Foreign Application Priority Data

Jul. 21, 2005   (KR) .................. 10-2005-0066348

(51) Int. Cl.
*G11B 5/54* (2006.01)
(52) U.S. Cl. ................ 360/256.4; 360/256.2
(58) Field of Classification Search ............ 360/256, 360/256.4, 256.2
See application file for complete search history.

(56) References Cited

U.S. PATENT DOCUMENTS

| 4,692,829 | A | | 9/1987 | Campbell ................ 360/105 |
|---|---|---|---|---|
| 5,369,538 | A | | 11/1994 | Moe et al. ................ 360/106 |
| 5,381,290 | A | * | 1/1995 | Cheng ................ 360/256.3 |
| 5,543,986 | A | | 8/1996 | Albrecht ................ 360/105 |
| 5,870,256 | A | * | 2/1999 | Khanna et al. .......... 360/256.4 |
| 6,118,636 | A | * | 9/2000 | Hatch et al. ............. 360/256.4 |
| 6,327,119 | B1 | * | 12/2001 | Barina et al. ............ 360/256.4 |
| 6,507,461 | B1 | | 1/2003 | Kimura et al. .......... 360/256.4 |
| 6,731,469 | B2 | | 5/2004 | Boutaghou .............. 360/256.4 |
| 6,735,053 | B2 | * | 5/2004 | Miyamoto et al. ....... 360/256.4 |
| 2003/0035246 | A1 | * | 2/2003 | Byun et al. ............. 360/256.4 |
| 2004/0257709 | A1 | | 12/2004 | Lee et al. ................ 360/256 |
| 2005/0057857 | A1 | | 3/2005 | Kawakami et al. ...... 360/256.4 |
| 2005/0152069 | A1 | | 7/2005 | Jeong .................... 360/256.2 |
| 2005/0180055 | A1 | * | 8/2005 | Kim et al. .............. 360/256.4 |
| 2006/0215329 | A1 | * | 9/2006 | Arikawa ................. 360/256.4 |
| 2007/0146937 | A1 | * | 6/2007 | Akama et al. .......... 360/256.4 |
| 2008/0192386 | A1 | * | 8/2008 | Hwang et al. .......... 360/256.2 |
| 2009/0059433 | A1 | * | 3/2009 | Kim et al. .............. 360/256 |

FOREIGN PATENT DOCUMENTS

| JP | 2002-100140 | 4/2002 |
|---|---|---|
| KR | 2001-0051743 | 6/2001 |
| KR | 10-2004-0110679 | 12/2004 |
| KR | 10-2005-0073853 | 7/2005 |

* cited by examiner

*Primary Examiner*—Jefferson Evans
(74) *Attorney, Agent, or Firm*—Staas & Halsey LLP

(57) ABSTRACT

An actuator latch device for locking an actuator of a hard disk drive, the actuator having a swing arm rotatably installed at a base member, a voice coil motor (VCM) coil provided at one end of the swing arm, and magnets oppositely arranged at the VCM coil. The actuator latch device includes a notch provided at one end of the swing arm; a latch lever, which is rotatably installed at a base member, having at a first end thereof a hook interfering with the notch to restrict one way rotation of the swing arm, and a counterbalance device at a second end thereof; and a stopper provided in the base member to block the counterbalance device to restrict a rotation of the latch lever.

16 Claims, 7 Drawing Sheets

ACTUATOR LATCH DEVICE FOR HARD DISK DRIVE

CROSS-REFERENCE TO RELATED APPLICATION

This application claims the benefit of Korean Patent Application No. 10-2005-0066348, filed on Jul. 21, 2005, in the Korean Intellectual Property Office, the disclosure of which is incorporated herein by reference.

BACKGROUND OF THE INVENTION

1. Field of the Invention

The present invention relates to a hard disk drive, and more particularly, to an actuator latch device for a hard disk drive, which latches an actuator in a certain position when a disc stops rotating in order to prevent the actuator from randomly rotating due to external shocks.

2. Description of Related Art

A hard disk drive (HDD), one of the information storage devices of a computer, is a device for recording/reproducing data on/from a disc using a magnetic head. When the HDD operates, the magnetic head of the hard disk drive comes to in contact with a surface of a rotating disc after it is moved by an actuator to a desired position at a certain height from a recording surface of rotating disc.

Meanwhile, when the hard disk drive does not operate, that is, when the disc stops rotating, the magnetic head has to be parked in a position outside the recording surface of the disc so as not to impinge upon the surface of the disc. Parking systems for HDDs are of two types: a contact start stop (CSS) type and a ramp loading type. In case of the CSS type parking system, the magnetic head is parked in a parking zone where data are not recorded, which is provided at an inner circumference of the disc. In case of the ramp loading type parking system, the magnetic head is parked on a ramp installed at the outside of the disc.

However, when the magnetic head is parked in the parking zone or on the ramp, if an external shock or vibration is applied to the hard disk drive, the actuator may randomly move, and thereby separate the magnetic head from the parking zone or the ramp. In this case, the magnetic head comes into contact with the surface of the disc, and thus both the magnetic head and the surface of the disc can be damaged. Thus, when the disc stops rotating and the magnetic head is parked in the parking zone or on the ramp, the actuator must be locked in the parking position so as not to move due to an external shock or vibration. To this end, a variety of actuator latch devices have been provided.

FIGS. 1A, 1B, and 1C are views illustrating a single lever type inertia latch device as an example of a conventional actuator latch device for a hard disk drive.

Referring first to FIG. 1A, an actuator 10 is installed in the hard disk drive so as to move a magnetic head for data reproducing and recording to a desired position on a disc. The actuator 10 includes a swing arm 12 rotatably coupled to a pivot 11, and a suspension 13 installed to one end of the swing arm 12 to support a slider 14 where the magnetic head is mounted. The suspension 13 resiliently biases the slider 14 toward the surface of the disc.

Further, an inertia latch device 20 is provided in the hard disk drive to lock the actuator 10 in a state where the magnetic head is parked on the ramp 15. The inertia latch device 20 includes one latch lever 21 rotating due to an inertia force, a latch hook 22 provided at a leading end of the latch lever, a notch 23 provided at the swing arm 12 of the actuator 10, a crash stop 24 restricting a clockwise rotation of the swing arm 12, and a latch stop 25 restricting a clockwise rotation of the latch lever 21.

When a clockwise rotational shock is applied to the hard disk drive, as illustrated in FIG. 1B, the swing arm 12 of the actuator 10 and the latch lever 21 rotate counterclockwise due to an inertia force so that the latch hook 22 is engaged with the notch 23, preventing rotation of the swing arm 12 of the actuator 10. Conversely, when a counterclockwise rotational shock is applied to the hard disk drive, as illustrated in FIG. 1C, the swing arm 12 of the actuator 10 and the latch lever 21 rotate clockwise due to an inertia force. Here, the swing arm 12 rotates firstly clockwise and secondly counterclockwise while impinging upon the crash stop 24 and rebounding therefrom, and the latch lever 21 also rotates counterclockwise while impinging upon the latch stop 25 and rebounding therefrom. Accordingly, the latch hook 22 interferes with the notch 23, thereby locking the actuator 10.

The single lever type inertia latch device 20 operates accurately when a clockwise rotational shock is applied to the hard disk drive such that the swing arm 12 of the actuator 10 rotates counterclockwise. However, when a counterclockwise rotational shock is applied to the hard disk drive, if rebounding timings of the swing arm 12 and the latch lever 21 do not coincide, the notch 23 of the swing arm 12 is not engaged with the latch hook 22 and the actuator 10 is not locked. Thus, it is difficult to securely lock the actuator 10.

FIGS. 2A, 2B, and 2C are views illustrating a dual lever type inertia latch that can prevent the above problem.

Referring first to FIG. 2A, an inertia latch device 40 for locking an actuator 30 includes respective first and second latch levers 41 and 42 rotating due to an inertia force, a latch pin 43 provided at the first latch lever 41, a latch hook 44 provided at the second latch lever 42, a notch 45 provided at a swing arm 32 of the actuator 30, and a crash stop 46 restricting a clockwise rotation of the swing arm 32.

If a clockwise rotational shock is applied to a hard disk drive including the dual lever type inertia latch device 40, as illustrated in FIG. 2B, the swing arm 32 of the actuator 30 and the respective first and second latch levers 41 and 42 rotate counterclockwise due to an inertia force so that the latch hook 44 is engaged with the notch 45, preventing rotation of the swing arm 32 of the actuator 30. Conversely, if a counterclockwise rotational shock is applied to the hard disk drive, as illustrated in FIG. 2C, the swing arm 32 of the actuator 30 and the first latch lever 41 rotate clockwise due to an inertia force. Here, the swing arm 32 rotates firstly clockwise and secondly counterclockwise while impinging upon the crash stop 46 and rebounding therefrom. The latch pin 43 interferes with the second latch lever 42 that rotates counterclockwise while the first latch lever 41 rotates clockwise. Accordingly, the latch hook 44 of the second latch lever 42 interferes with the notch 45 to restrict the counterclockwise rotation of the swing arm 32.

The conventional dual lever type inertia latch device 40 operates stably when clockwise and counterclockwise rotational shocks are applied to the hard disk drive. However, it requires two of latch levers 41 and 42 so that a structure thereof is complicated and an installation space is large due to its size, thereby causing problems in that manufacturing cost and assembly time are increased, and that it is difficult to be used for a small size mobile disc drive.

BRIEF SUMMARY

An aspect of the present invention provides an actuator latch device for a hard disk drive, which has improved locking and unlocking reliability.

An aspect of the present invention also provides an actuator latch device for a hard disk drive, which prevents component wear.

According to an aspect of the present invention, there is provided an actuator latch device for locking an actuator of a hard disk drive, the actuator having a swing arm rotatably installed at a base member, a voice coil motor (VCM) coil coupled to one end of the swing arm, and magnets oppositely arranged at the VCM coil, the actuator latch device including: a notch provided at one end of the swing arm; a latch lever, which is rotatably installed at a base member, which is rotatably installed at a base member, having at a first end thereof a hook interfering with the notch to restrict one way rotation of the swing arm, and a counterbalance device at a second end thereof; and a stopper provided in the base member to block the counterbalance device to restrict a rotation of the latch lever.

Imaginary lines extending from impact surfaces of the stopper and the counterbalance device may pass through the center of rotation of the latch lever.

A damping hole may be formed in the vicinity of the impact surface in the counterbalance device.

A damping slot may be formed in the vicinity of the impact surface in the counterbalance device.

The counterbalance device may block the swing arm to restrict a counter-rotation of the swing arm, and a damping arm may be provided in the counterbalance device to absorb a shock due to an impact between the counterbalance device and the swing arm.

The damping arm may be provided with a protrusion to reduce a contact area with the swing arm.

The damping arm may be formed of an elastic material.

The actuator latch device may further comprise a first iron core provided at one end of the swing arm to allow the swing arm to receive a torque by a leakage flux of the magnet, and a second iron core provided at the counterbalance device of the latch lever to allow the latch lever to receive a torque by a leakage flux of the magnet.

The first iron core may be larger in size than the second iron core.

The latch arm and counterbalance device of the latch lever each may be provided with weights to adjust an inertia force applied to the latch lever.

A portion of the latch arm excluding the hook may not come into contact with one end of the swing arm.

According to another aspect of the present invention, there is provided an actuator lock, including: a notch at an end of a swing arm; a rotatable latch lever having a hook at an end and a counterbalancer at another end, the hook interfering with the notch to restrict random rotation of the swing arm; and a stopper blocking the counterbalancer so as to restrict a rotation of the latch lever.

According to another aspect of the present invention, there is provided a hard disk drive, including: a notch at an end of a swing arm of an actuator, the swing arm rotatably mounted on a base; a latch lever rotatably mounted on the base and having a hook at a first end and a counterbalancer at a second end, the hook interfering with the notch so as to restrict random rotation of the swing arm; and a stopper on the base to block the counterbalancer when the counterbalancer rotates beyond a permissible range so as to restrict rotation thereof.

According to another aspect of the present invention, there is provided a method of preventing a parked magnetic head at an end of a swing arm from separating from a parking ramp by rotation of an actuator due to external shock, the method including: engaging a hook at an end of a latch lever with a notch at an end of the swing arm so as to restrict random rotation of the swing arm; blocking, via a stopper, a counterbalance device at another end of the latch lever so as to restrict rotation of the latch lever; and absorbing a shock due to an impact of the counterbalance device and the stopper.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1A:
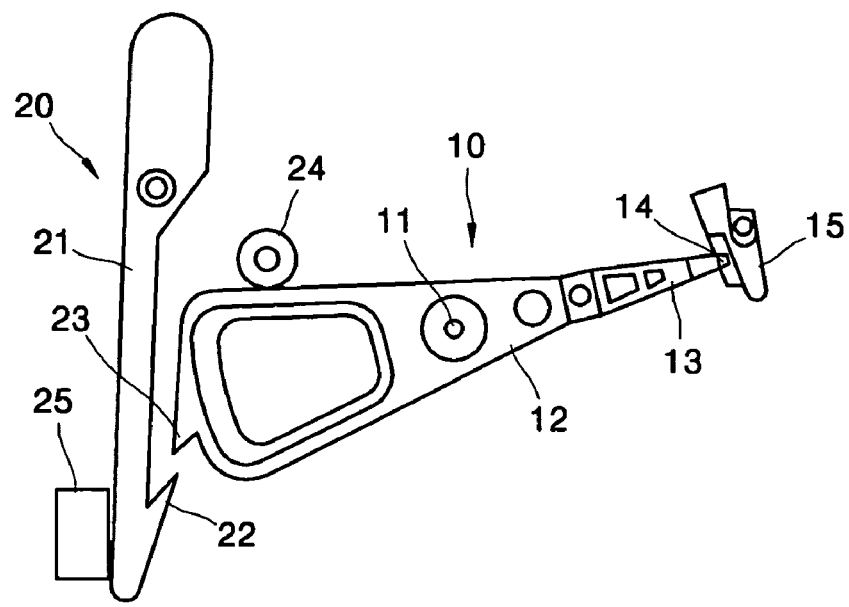
FIGS. 1A, 1B, and 1C are views for explaining a structure and an operation of a single lever type inertia latch device in a conventional hard disk drive.
Figure 1B:
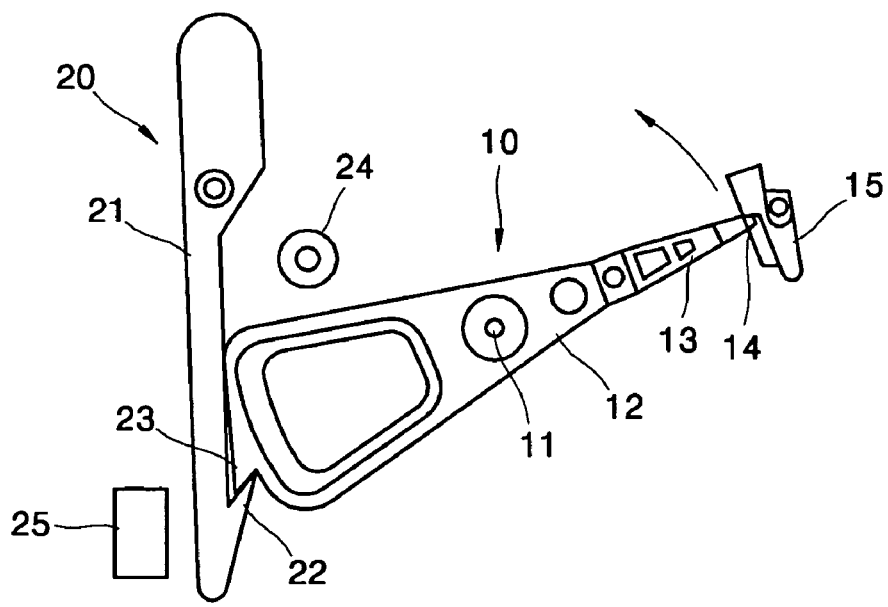
Figure 1C:
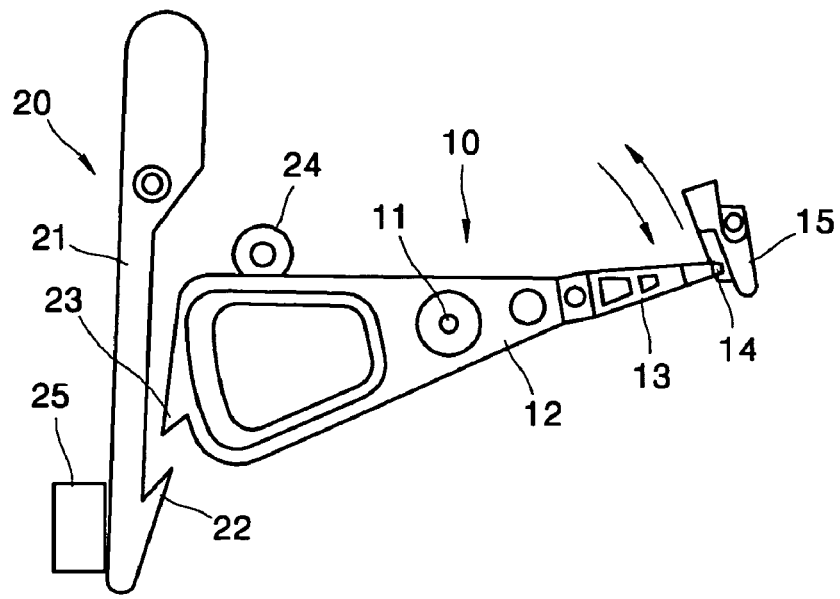
Figure 2A:
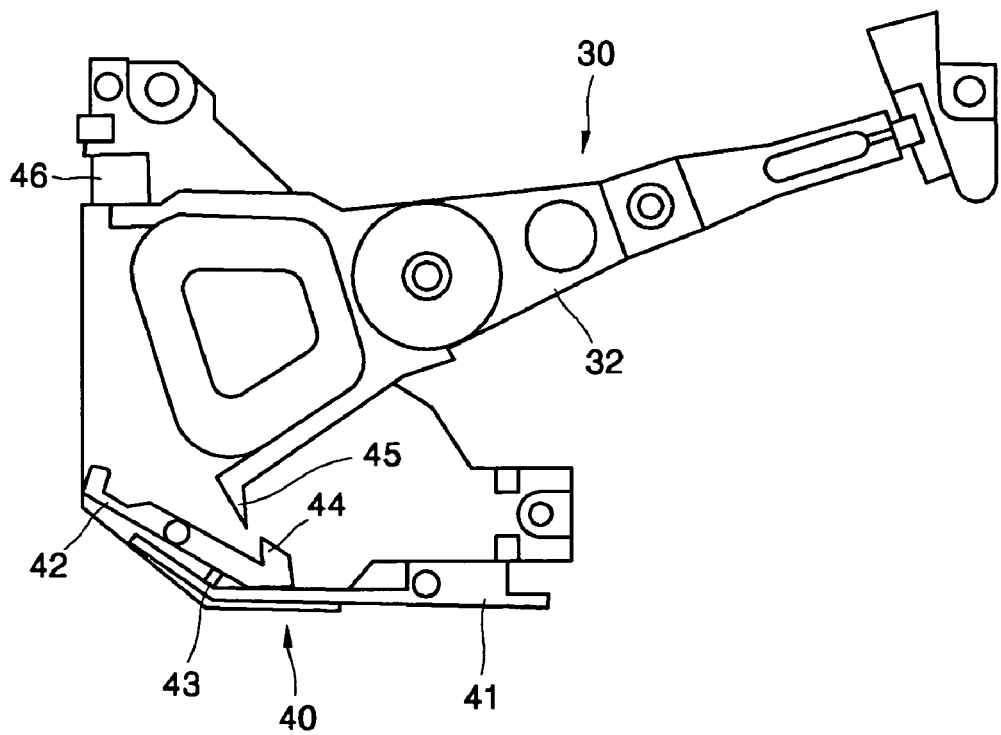
FIGS. 2A, 2B, and 2C are views for explaining a structure and an operation of a dual lever type inertia latch device in a conventional hard disk drive.
Figure 2B:
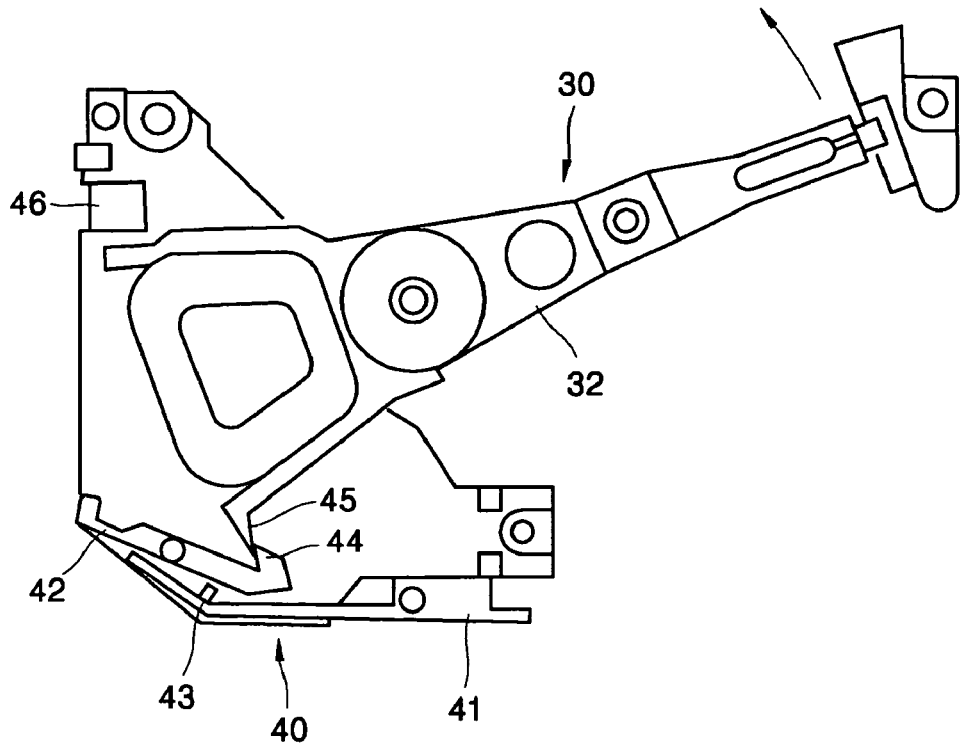
Figure 2C:
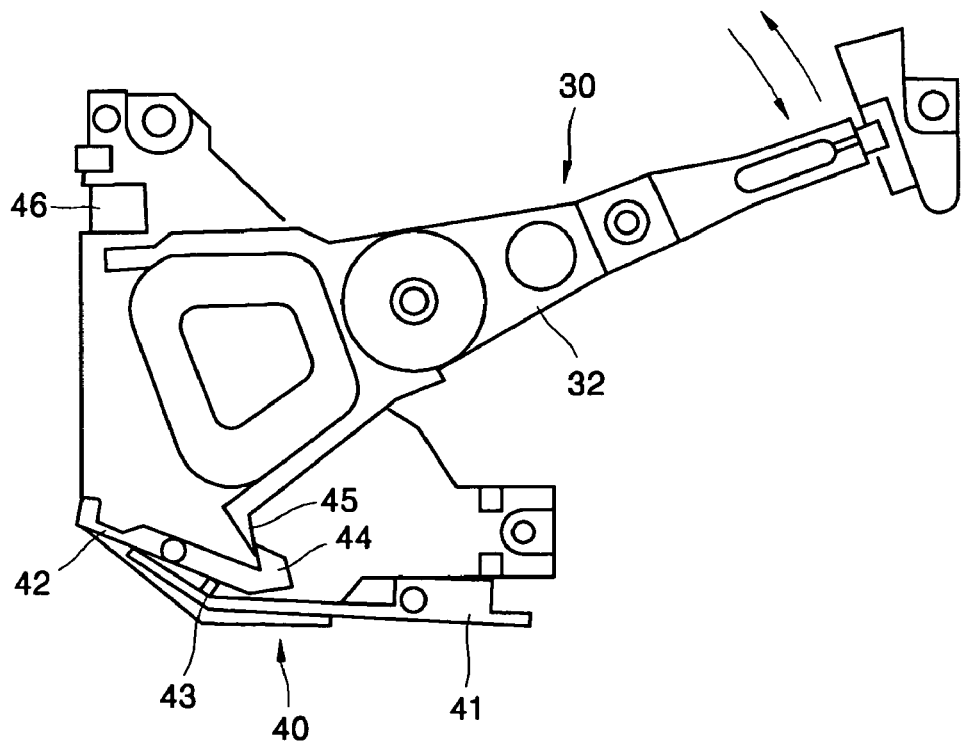

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 3:
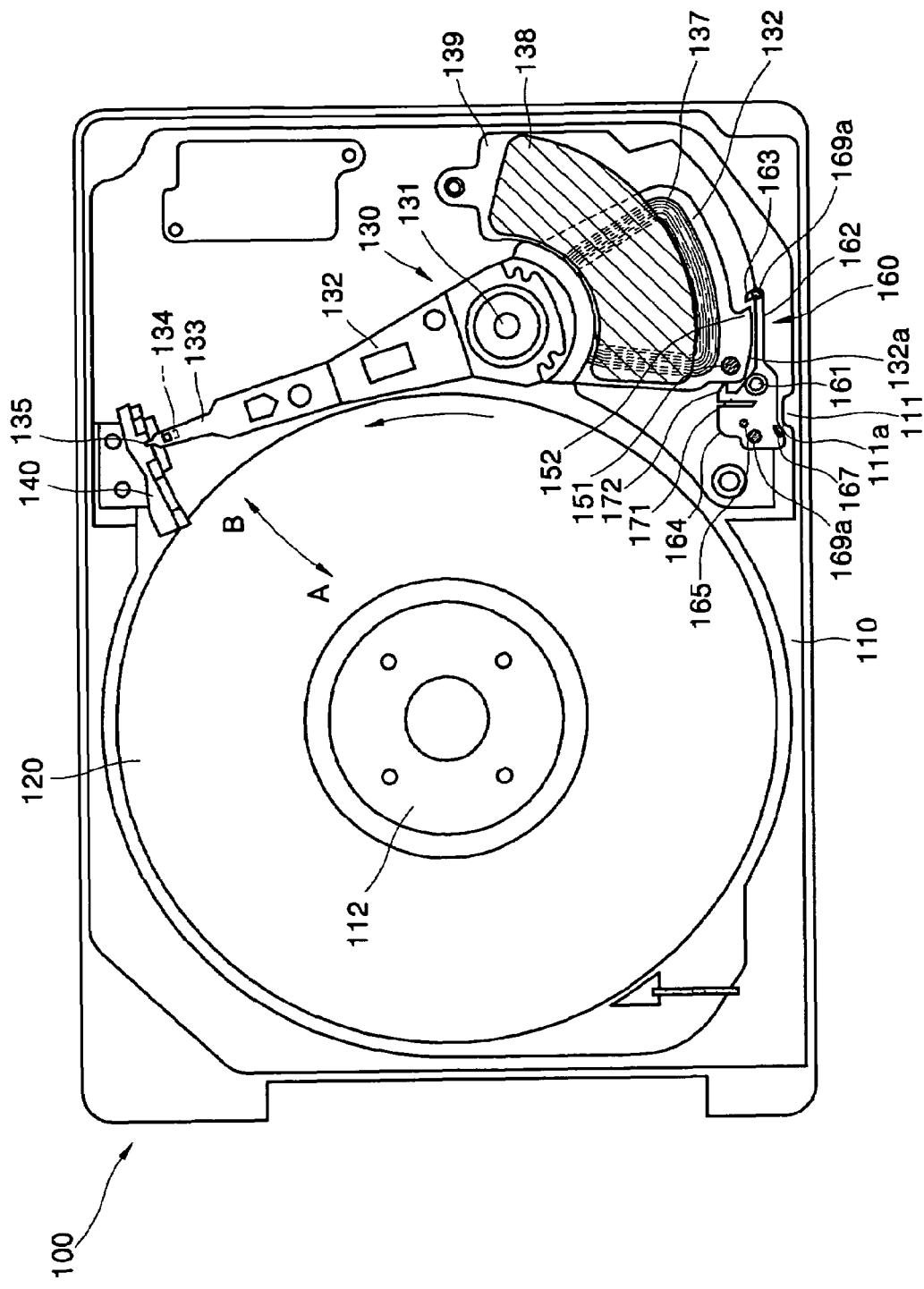
FIG. 3 is a plan view of a hard disk drive with an actuator latch device according to an embodiment of the present invention.
Figure 4:
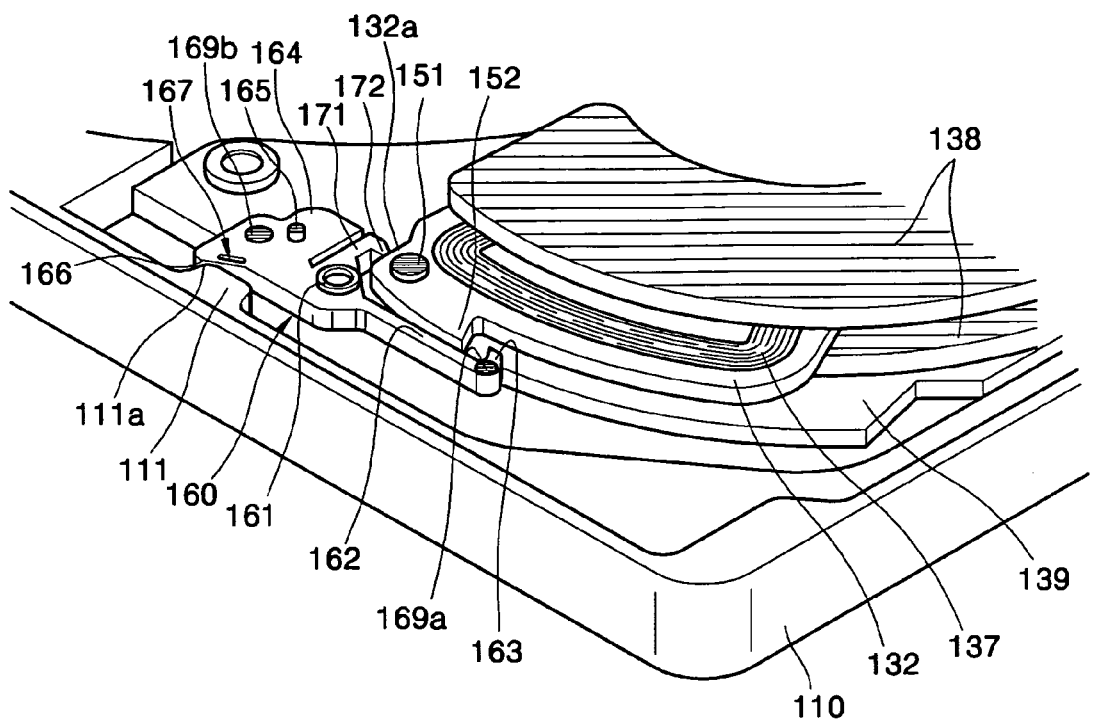
FIGS. 4 and 5 are a perspective view and a plan view, respectively, of the actuator latch device of FIG. 3.
Figure 5:
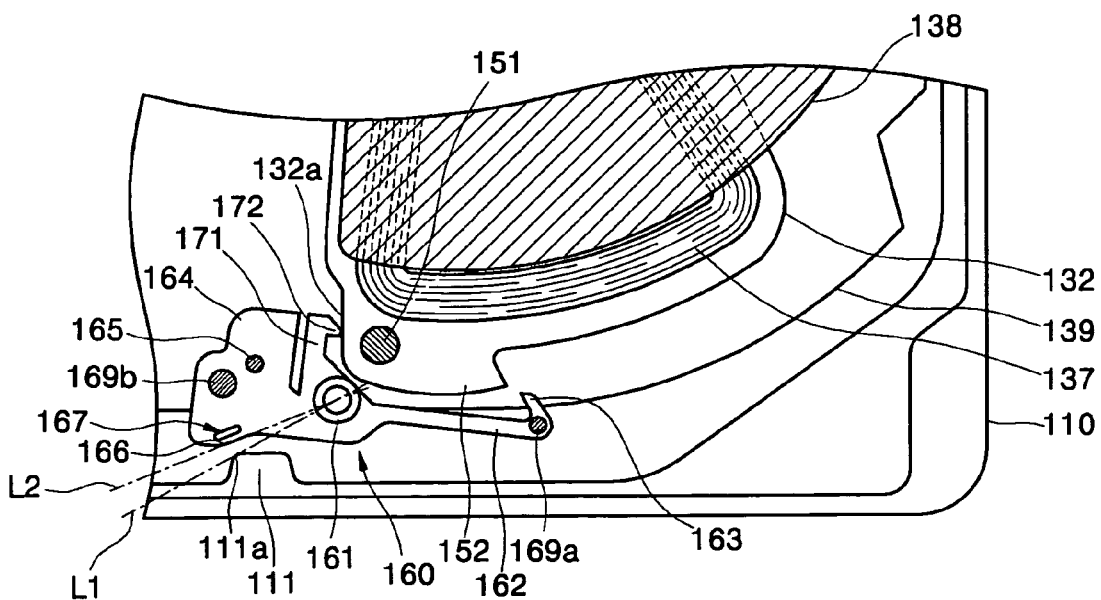
Figure 8:
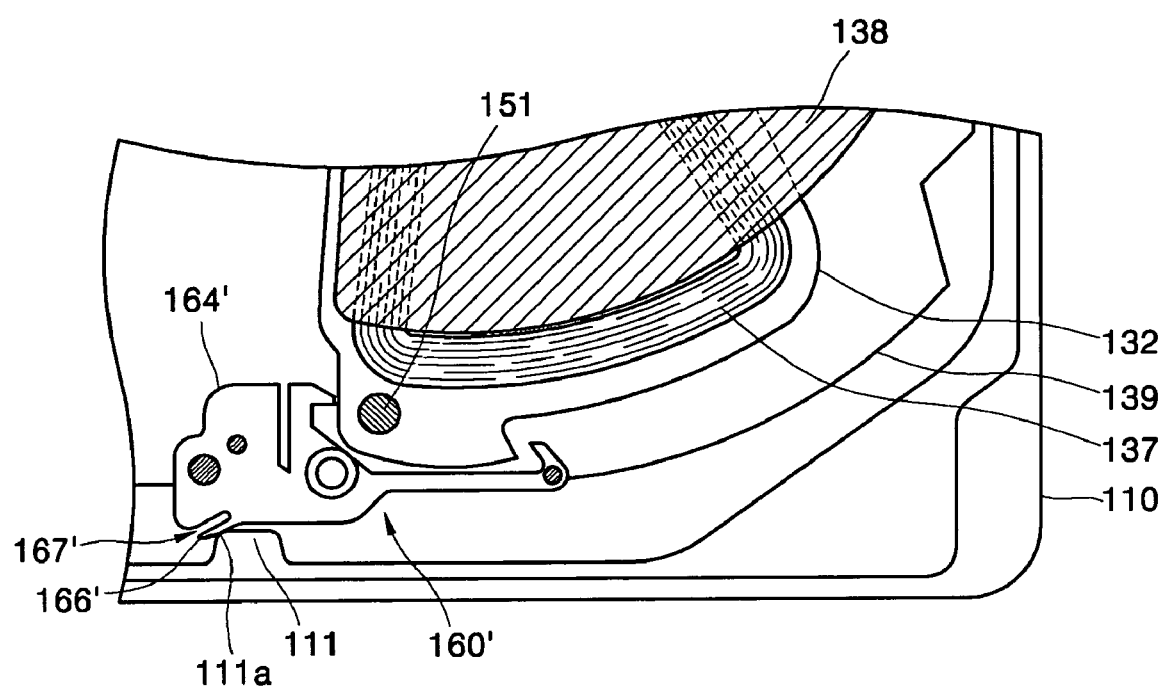
FIG. 8 is a plan view of an actuator latch device according to another embodiment of the present invention.

FIG. 3 is a plan view of a hard disk drive with an actuator latch device according to an embodiment of the present invention, FIGS. 4 and 5 are a perspective view and a plan view, respectively, of the actuator latch device of FIG. 3, and FIG. 8 is a plan view of an actuator latch device according to another embodiment of the present invention.

Referring to FIGS. 3 to 5, a hard disk drive 100 includes a spindle motor 112, a disc 120 mounted on the spindle motor to rotate, and an actuator 130 for moving a magnetic head for recording and reproducing data to a desired position on the disc 120. The actuator 130 includes a swing arm 132 rotatably coupled to an actuator pivot 131 installed at a base member 110 of the hard disk drive 100, a suspension 133 installed at a leading end of the swing arm 132 to support a slider 134 having he magnetic head to be resiliently biased toward the surface of the disc 120, and a voice coil motor (VCM) for rotating the swing arm 132.

The VCM includes a VCM coil 137 provided at a rear end of the swing arm 132, and upper and lower magnets 138 oppositely arranged to the VCM coil 137. The magnets are attached and supported by a yoke 139 fixedly installed at the base member 110. Meanwhile, the magnets 138 may be disposed only at the upper or lower portion of the VCM coil 137. The voice coil motor is controlled by a servo control system so that the swing arm 132 is rotated in a direction according to Fleming's left-hand rule by an interaction between an electric current input to the VCM coil 137 and a magnetic field of the magnets 138. That is, when the hard disk drive 100 is turned ON and the disc 120 starts to rotate, the VCM moves the swing arm 132 counterclockwise (in the direction of an arrow A of FIG. 3) to move the magnetic head into a position on the recording surface of the disc 120. Conversely, when the hard disk drive 100 is turned OFF and the disc 120 stops to rotate, the VCM moves the swing arm 132 clockwise (in the direction of an arrow B of FIG. 3) to separate the magnetic head from the disc 120.

The magnetic head separated from the recording surface of the disc 120 is parked on a ramp 140 provided outside of the disc 120. To be more specific, when the disc 20 stops rotating, the swing arm 132 is rotated in the direction of the arrow B by the VCM, thereby parking an end-tab 135 formed at an end of the suspension 133 on the ramp 140.

The hard disk drive 100 is provided with an actuator latch device. The actuator latch device serves to lock the actuator 130 so as to park the magnetic head mounted on the actuator 130 on the ramp 140 when the disc 120 stops rotating. That is, the actuator latch device prevents the magnetic head from separating from the ramp 140 and moving over the disc 120 by an unnecessary rotation of the actuator 130 due to external shock or vibration when the disc 120 stops rotating. If the magnetic head moves over the disc 120 when the disc 120 stops rotating, the magnetic head comes into contact with the surface of the disc 120, resulting in damage to both the surface of the disc 120 and the magnetic head.

The actuator latch device includes a notch 152 formed at the rear end of the swing arm 132, and a latch lever 160 rotatably mounted at the base member 110. The rear end of the swing arm 132 is generally formed by plastic injection, and the notch 152 formed at the rear end of the swing arm 132 may be formed by plastic injection to horizontally protrude from the rear end of the swing arm 132.

The latch lever 160 includes a pivot 161 mounted at the base member 110, a latch arm 162 provided at one end thereof, and a counterbalance device 164 provided at other end thereof. A hook 163 is provided at a leading end of the latch arm 162 to interfere with the notch 152 when the actuator is locked. If an external clockwise or counterclockwise rotational shock is applied to the hard disk drive 100, a counterclockwise or clockwise rotational inertia force is applied to the latch lever 160. Accordingly, the hook 163 of the latch arm 162 is engaged with the notch 152 of the swing arm 132, restricting a random rotation of the swing arm 132.

A stopper 111 is formed at the end of the base member 110 to block the counterbalance device 164 to restrict the counterclockwise rotation of the latch lever 160. Specifically, the stopper 111 comes in contact with the counterbalance device 164 of the latch lever 160 rotating counterclockwise by an inertia force, thereby restricting the rotation of the latch lever 160. A line L1 extending from an impact surface 111a of the stopper 111 impacting against the counterbalance device 164 and a line L2 extending form an impact surface 166 of the counterbalance device 164 corresponding to the impact surface 111a pass through the center of rotation of the latch lever 160. Accordingly, when the counterbalance device 164 comes in contact with the stopper 111, friction between the impact surfaces 166 and 111a of the counterbalance device 164 and the stopper 111 can be minimized, and particles due to wear of the stopper 111 and the counterbalance device 164 by the impact between the impact surfaces 111a and 166 are thus reduced.

A damping hole 167 passing through the counterbalance device 164 is formed in the vicinity of the impact surface 166 in the counterbalance device 164. The damping hole 167 absorbs a shock due to an impact between the counterbalance device 164 and the stopper 111 to prevent damage of the latch lever 160 and to reduce an impact noise.

Meanwhile, in another embodiment of the present invention illustrated in FIG. 8, a damping slot 167' may be formed in the vicinity of the impact surface 166' in the counterbalance device 164' that comes in contact with the stopper 111. The damping slot 167' passes through the counterbalance device 164' and is opened at the outer circumference thereof. The damping slot 167' has the same effect of preventing impact damage of the latch lever 160' and of reducing impact noise as that of the damping hole 167 in FIGS. 3 to 5.

Referring again to FIGS. 3 to 5, the clockwise rotation of the swing arm 132 due to an inertia force is restricted by the counterbalance device 164. Specifically, the counterbalance device 164 comes in contact with the rear end side 132a of the swing arm 132 rotating clockwise due to an inertia force, thereby restricting the clockwise rotation of the swing arm 132. The counterbalance device 164 is provided with a damping arm 171 to absorb a shock due to an impact with the swing arm 132. The damping arm 171' may be formed of an elastic material, for example, a plastic material such as polyimid so as to substantially function as a spring.

The damping arm 171 is provided with a protrusion 172 protruding toward the rear end side 132a of the swing arm 132. The protrusion 172 reduces a contact area between the damping arm 171 and the swing arm 132, thereby reducing wear and generation of abrasion particles.

A first iron core 151 and a second iron core 165 are provided at the swing arm 132 and the latch lever 160, respectively. The first iron core 151 is disposed at one corner of the rear end of the swing arm 132. The first iron core 151 may be formed of a magnetic material, such as, for example, a ferromagnetic steel, to interact with the magnet 138. The first iron core 151 serves to apply a clockwise torque to the swing arm 132. Specifically, the first iron core 151 is affected by a leakage flux generated by the magnet 138 so that the swing arm 132 receives a clockwise rotational torque due to a magnetic force oriented from the first iron core 151 toward the magnet 138. The clockwise torque applied to the swing arm 132 serves to lock the actuator against a relatively weak rotational impact and vibration.

The second iron core 165 is disposed at the counterbalance device 164. The second iron core 165 may also be formed of a magnetic material, such as, for example, a ferromagnetic steel, to interact with the magnet 138. The second iron core 165 serves to apply a clockwise torque to the latch lever 160. Specifically, the second iron core 165 is affected by a leakage flux generated by the magnet 138 so that the latch lever 160 receives a clockwise rotational torque due to a magnetic force oriented from the second iron core 165 toward the magnet 138. If the first iron core 151 larger than the second iron core 165, the amount of torque applied to the swing arm 132 is higher than that applied to the latch lever 160, maintaining a stable locking state of the actuator 130.

Meanwhile, respective first and second weights 169a and 169b are provided at the latch arm 162 and the counterbalance device 164, respectively, of the latch lever 160. The first weight 169a is installed at the leading end of the latch arm 132, i.e., near the hook 163, and the second weight 169b is installed at the rear end of the counterbalance device 164. By adjusting the size of first and second weights 169a and 169b, the latch arm 162 and the counterbalance device 164 can be weight balanced, and the inertia force applied to the latch lever can be controlled properly.

Figure 6:
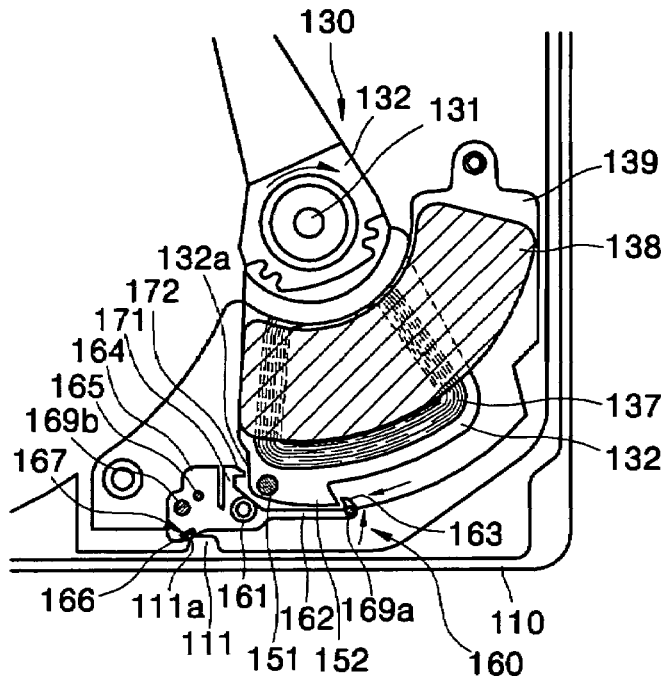
FIGS. 6 and 7 are views for explaining a locking operation and a unlocking operation of the actuator latch device of FIG. 3.
Figure 7:
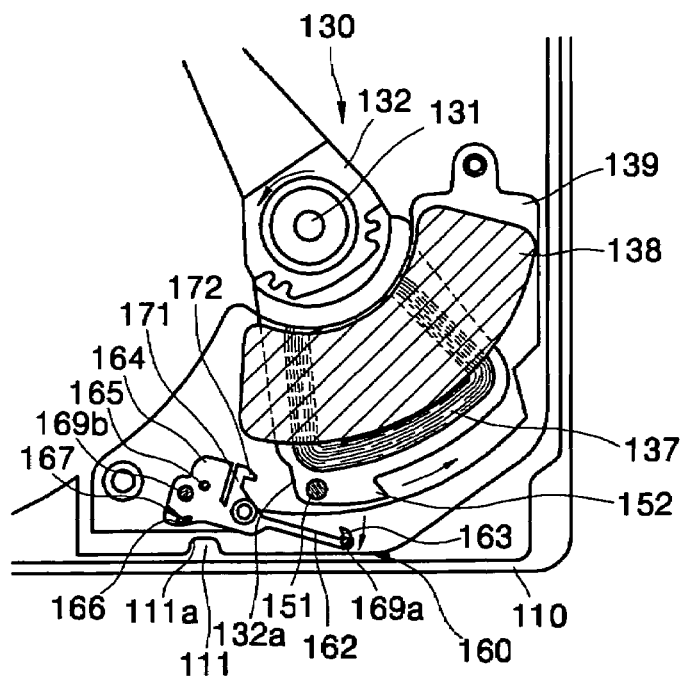

FIGS. 6 and 7 are views for explaining a locking operation and an unlocking operation of the actuator latch device in FIG. 3.

Referring to FIGS. 3 and 6, when the disk drive stops operating (i.e., the disk stops rotating) and the magnetic head mounted on the slider 134 is parked on the ramp 140, the swing arm 132 rotates clockwise about the pivot 131. Thus, the rear end side 132a of the swing arm 132 comes into contact with the protrusion 172 provided at the damping arm 171 of the latch lever 160 to allow the latch lever to rotate counterclockwise about the rotation center 161 by being pushed by the swing arm 132.

When the magnetic head is parked on the ramp 140 so that the swing arm 132 stops to rotate clockwise, the actuator 130 is locked such that the magnetic head does not move toward the disc 120 by an unexpected external force. Thus, a rotational driving force applied to the swing arm 132 by the VCM is removed, and the actuator 130 is maintained in a locked state by a clockwise torque applied to the swing arm 132 by the first iron core 151 and the magnet 138. As described before, the swing arm 132 receives a larger torque than that applied to the latch lever 160, so that the locked state of the actuator 130 can be maintained more stably.

Meanwhile, if the hard disk drive 100 (see FIG. 3) receives a clockwise rotational impact larger than the torque applied to the swing arm 132 by the first iron core 151 and the magnet 138, the swing arm 132 and the latch lever 160 rotate counterclockwise by an inertia force, so that the notch 152 of the swing arm 132 is engaged with the hook 163 of the latch arm 162, restricting the counterclockwise rotation of the swing arm 132. Accordingly, since the counterbalance device 164 of the latch lever 160 comes in contact with the stopper 111 to restrict the counterclockwise rotation of the latch lever 160, a portion of the latch arm 162 excluding the hook 163 does not come into contact with the rear portion of the swing arm 132.

Conversely, if the hard disk drive 100 receives a counterclockwise rotational impact, the swing arm 132 and the latch lever 160 receives a clockwise rotational inertia force. Accordingly, the rear end side 132a of the swing arm 132 impacts upon the damping arm 171 of the latch lever 160. Due to this impact, in spite of the counterclockwise rotation of the latch lever 160, the degree of rotation thereof is restricted by the impact between the stopper 111 and the counterbalance device 164, also restricting the clockwise rotation of the swing arm 132. At this time, even though the swing arm 132 rotates counterclockwise again, the notch 152 of the swing arm 132 is engaged with the hook 163 of the latch arm 162 to restrict the counterclockwise rotation of the swing arm 132 as well.

Referring to FIGS. 3 and 7, when a power is applied to the VCM coil 137 provided at the rear end of the swing arm 132 so as to operate the hard disk drive 100, the swing arm 132 rotates counterclockwise while overcoming the clockwise torque due to a magnetic interaction between the first iron core 151 and the magnet 138. At the same time, the latch lever 160 rotates clockwise due to the clockwise torque applied by the second iron core 165 and the magnet 138, so that the notch 152 of the swing arm 132 rotating counterclockwise does not interfere with the hook 163 of the latch lever 160.

According to the actuator latch device of the above-described embodiments of the present invention, a rotating latch lever impacts upon a stopper fixed at a base member to reduce a frictional contact therebetween, thereby preventing the generation of abrasion particles in the hard disk drive. Particularly, if imaginary lines extending from the impact surfaces of the latch lever and the stopper, respectively, pass through the center of rotation of the latch lever, the frictional contact can be minimized.

Further, a damping hole or damping slot is provided to the latch lever so as to absorb an impact shock with the stopper, thereby preventing damage of the latch lever and reducing impact noise.

Furthermore, a damping arm absorbs an impact shock between the swing arm and the latch lever, thereby preventing damage of the latch lever and the swing arm and reducing impact noise as well.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An actuator latch device for locking an actuator of a hard disk drive, the actuator having a swing arm rotatably installed on a base member, a voice coil motor (VCM) coil provided at an end of the swing arm, and magnets oppositely arranged at the VCM coil, the actuator latch device comprising:
   a notch provided at the end of the swing arm;
   a latch lever rotatably installed on the base member and having at a first end thereof a hook interfering with the notch to restrict one way rotation of the swing arm, and a counterbalance device at a second end thereof;
   a stopper on the base member to block the counterbalance device so as to restrict a rotation of the latch lever; and
   a first iron core at an end of the swing arm to allow the swing arm to receive a torque by a leakage flux of the magnet, and a second iron core at the counterbalance device of the latch lever to allow the latch lever to receive a torque by a leakage flux of the magnet.

2. The actuator latch device according to claim 1, wherein imaginary lines extending from impact surfaces of the stopper and the counterbalance device pass through a center of rotation of the latch lever.

3. The actuator latch device according to claim 1, wherein a damping hole is formed near an impact surface of the counterbalance device and absorbs a shock caused by an impact of the counterbalance device and the stopper.

4. The actuator latch device according to claim 1, wherein a damping slot is formed near an impact surface of the counterbalance device and absorbs a shock caused by an impact of the counterbalance device and the stopper.

5. The actuator latch device according to claim 1, wherein the counterbalance device blocks the swing arm to restrict a counter-rotation of the swing arm, and a damping arm is provided in the counterbalance device to absorb a shock due to an impact between the counterbalance device and the swing arm.

6. The actuator latch device according to claim 5, wherein the damping arm has a protrusion to reduce a contact area with the swing arm.

7. The actuator latch device according to claim 5, wherein the damping arm is formed of an elastic material.

8. The actuator latch device according to claim 1, wherein the first iron core is larger than the second iron core.

9. An actuator latch device for locking an actuator of a hard disk drive, the actuator having a swing arm rotatably installed on a base member, a voice coil motor (VCM) coil provided at an end of the swing arm, and magnets oppositely arranged at the VCM coil, the actuator latch device comprising:
- a notch provided at the end of the swing arm;
- a latch lever rotatably installed on the base member and having at a first end thereof a hook interfering with the notch to restrict one way rotation of the swing arm, and a counterbalance device at a second end thereof; and
- a stopper on the base member to block the counterbalance device so as to restrict a rotation of the latch lever,
- wherein the latch arm and the counterbalance device of the latch lever each are provided with weights to adjust an inertia force applied to the latch lever.

10. The actuator latch device according to claim 1, wherein a portion of the latch arm excluding the hook does not contact one end of the swing arm.

11. An actuator lock, comprising:
- a notch at an end of a swing arm;
- a rotatable latch lever having a hook at an end and a counterbalancer at another end, the hook interfering with the notch to restrict random rotation of the swing arm;
- a stopper blocking the counterbalancer so as to restrict a rotation of the latch lever; and
- first and second iron cores, the first iron core at an end of the swing arm to transfer a torque caused by leakage flux of a magnet, the second iron core at the counterbalancer to transfer a torque caused by leakage flux of the magnet.

12. The actuator lock according to claim 11, further comprising a damping hole near an impact surface of the counterbalancer to absorb a shock caused by an impact of the counterbalancer and the stopper.

13. The actuator lock according to claim 11, further comprising a damping slot near an impact surface of the counterbalancer to absorb a shock caused by an impact of the counterbalancer and the stopper.

14. The actuator lock according to claim 11, wherein the counterbalancer blocks the swing arm to restrict a counter-rotation of the swing arm, and the counterbalancer includes a damping arm which absorbs a shock caused by an impact of the counterbalancer and the swing arm.

15. A hard disk drive, comprising:
- a notch at an end of a swing arm of an actuator, the swing arm rotatably mounted on a base;
- a latch lever rotatably mounted on the base and having a hook at a first end and a counterbalancer at a second end, the hook interfering with the notch so as to restrict random rotation of the swing arm;
- a stopper on the base to block the counterbalancer when the counterbalancer rotates beyond a permissible range so as to restrict rotation thereof; and
- first and second iron cores, the first iron core at an end of the swing arm to transfer a torque caused by leakage flux of a magnet, the second iron core at the counterbalancer to transfer a torque caused by leakage flux of the magnet.

16. A method of preventing a parked magnetic head at an end of a swing arm from separating from a parking ramp by rotation of an actuator due to external shock, comprising:
- engaging a hook at an end of a latch lever with a notch at an end of the swing arm so as to restrict random rotation of the swing arm;
- blocking, via a stopper, a counterbalance device at another end of the latch lever so as to restrict rotation of the latch lever;
- absorbing a shock due to an impact of the counterbalance device and the stopper;
- providing a first iron core at an end of the swing arm to transfer a torque caused by leakage flux of a magnet; and
- providing a second iron core at the counterbalancer device to transfer a torque caused by leakage flux of the magnet.

* * * * *